United States Patent
Reznik et al.

(10) Patent No.: US 12,495,058 B1
(45) Date of Patent: Dec. 9, 2025

(54) SYSTEM AND METHOD FOR DETECTING VULNERABILITY OF DATA IN A CLOUD COMPUTING ENVIRONMENT

(71) Applicant: Wiz, Inc., New York, NY (US)

(72) Inventors: Roy Reznik, Tel Aviv (IL); Ami Luttwak, Binyamina (IL); Yinon Costica, Tel Aviv (IL); George Pisha, Giv'atayim (IL); Yaniv Shaked, Tel Aviv (IL); Avi Tal Lichtenstein, Tel Aviv (IL)

(73) Assignee: Wiz, Inc., New York, NY (US)

( * ) Notice: Subject to any disclaimer, the term of this patent is extended or adjusted under 35 U.S.C. 154(b) by 181 days.

(21) Appl. No.: 17/809,981

(22) Filed: Jun. 30, 2022

(51) Int. Cl.
*H04L 9/40* (2022.01)

(52) U.S. Cl.
CPC ........ *H04L 63/1433* (2013.01); *H04L 63/205* (2013.01)

(58) Field of Classification Search
CPC .......................... H04L 63/1433; H04L 63/205
See application file for complete search history.

(56) References Cited

U.S. PATENT DOCUMENTS

| | | | |
|---|---|---|---|
| 8,429,364 B1 | 4/2013 | Orcutt | |
| 9,021,605 B2 | 4/2015 | Blue et al. | |
| 10,542,015 B2* | 1/2020 | Bird | H04L 63/1416 |
| 11,575,696 B1* | 2/2023 | Ithal | G06F 16/211 |
| 11,580,251 B1* | 2/2023 | Jiang | G06F 16/2457 |
| 11,831,667 B2* | 11/2023 | Panse | H04L 63/168 |
| 11,962,623 B2* | 4/2024 | Keren | H04L 63/1425 |
| 12,309,188 B1* | 5/2025 | Al Ghazo | H04L 63/1425 |
| 2008/0098479 A1* | 4/2008 | O'Rourke | H04L 63/1433 726/25 |
| 2009/0293128 A1* | 11/2009 | Lippmann | H04L 63/1433 707/999.1 |
| 2019/0260575 A1 | 8/2019 | Nenov et al. | |
| 2020/0099704 A1* | 3/2020 | Lee | H04L 63/1416 |
| 2021/0014265 A1* | 1/2021 | Hadar | H04L 63/1433 |
| 2022/0179964 A1* | 6/2022 | Qiao | G06F 16/9024 |
| 2022/0191230 A1* | 6/2022 | Morgan | H04L 63/20 |
| 2023/0018096 A1* | 1/2023 | Ueda | H04L 63/145 |
| 2023/0054704 A1* | 2/2023 | Ghalaty | G06F 16/906 |
| 2023/0094856 A1* | 3/2023 | Ithal | H04L 63/102 726/4 |

(Continued)

*Primary Examiner* — Oleg Survillo
(74) *Attorney, Agent, or Firm* — M&B IP Analysts, LLC

(57) ABSTRACT

A system and method for detecting sensitive data vulnerability in a cloud computing environment detects sensitive data in the cloud computing environment, and determines reachability parameters of a workload having access to the sensitive data. The method includes detecting sensitive data associated with a cloud entity in a cloud computing environment, the cloud computing environment is being deployed with a plurality of cloud entities; querying a graph database storing a security graph to detect a node associated with the cloud entity, wherein the security graph represents the cloud computing environment; determining a reachability path to the node, wherein the reachability path allows access to the cloud entity from a network external to the cloud computing environment; and generating an instruction to secure the sensitive data in response to determining the reachability path.

29 Claims, 4 Drawing Sheets

(56) References Cited

U.S. PATENT DOCUMENTS

| | | | |
|---|---|---|---|
| 2023/0123477 A1* | 4/2023 | Luttwak | H04L 63/1425 |
| | | | 726/25 |
| 2023/0236881 A1* | 7/2023 | Saliba | H04L 63/107 |
| | | | 718/102 |
| 2023/0336578 A1* | 10/2023 | Lidgi | H04L 63/1433 |
| 2023/0394722 A1* | 12/2023 | Shrivastava | G06T 11/206 |
| 2023/0421573 A1* | 12/2023 | Lichtenstein | H04L 63/14 |
| 2024/0078436 A1* | 3/2024 | Su | G06N 3/094 |
| 2024/0214398 A1* | 6/2024 | Lidgi | H04L 63/1416 |
| 2024/0291863 A1* | 8/2024 | Cohen | H04L 63/1483 |

\* cited by examiner

SYSTEM AND METHOD FOR DETECTING VULNERABILITY OF DATA IN A CLOUD COMPUTING ENVIRONMENT

TECHNICAL FIELD

The present disclosure relates generally to data protection, and specifically to determining vulnerability of sensitive data in cloud computing environments.

BACKGROUND

Cloud computing infrastructures, such as Amazon® Web Services (AWS), Microsoft® Azure, Google® Cloud Platform (GCP) and the like, allow for setting up cloud computing environments, such as virtual private clouds (VPCs). A VPC deployed on a cloud computing infrastructure allows to provision hardware resources as virtual instances, thus allowing multiple tenants to use the hardware resources of the cloud computing infrastructure.

With the advantages of cloud computing environments however, also come vulnerabilities. For example, while e-commerce has provided consumers with benefits, it has also been the source of data leaks, whereby consumer information, such as personal identifiable information, credit card numbers, and the like, are exposed to the public. This is undesirable.

Data breaches are estimated to cause damages measured in billions of dollars annually. Organizations may not always be aware of where and how such sensitive data is stored within the organization's cloud computing environment, and whether or not it is accessible from external networks, such as the Internet.

Certain solutions provide external attack surface management (EASM). EASM solutions often attempt to access a secure network by randomly guessing ports, domains, IP addresses, and the like, in order to gain access to the secure network and attempt to locate sensitive data or compromised machines. Such solutions utilize an approach that drains processing resources and are intensive in their use of network bandwidth. Furthermore, due to the randomness of such testing, vulnerabilities in the secure network may be overlooked.

Other solutions attempt to identify sensitive data structures and mapping where such structures are stored in a network environment. For example, a solution may detect a database which can be used to store sensitive data. However, such solutions may not provide information on whether data is actually stored in such the data structure, and do not know if sensitive data stored in such a data structure in the network environment is externally exposed.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting sensitive data vulnerability in a cloud computing environment. The method comprises: detecting sensitive data associated with a cloud entity in a cloud computing environment, the cloud computing environment is being deployed with a plurality of cloud entities; querying a graph database storing a security graph to detect a node associated with the cloud entity, wherein the security graph represents the cloud computing environment; determining a reachability path to the node, wherein the reachability path allows access to the cloud entity from a network external to the cloud computing environment; and generating an instruction to secure the sensitive data in response to determining the reachability path.

Certain embodiments disclosed herein also include a non-transitory computer readable medium having stored thereon causing a processing circuitry to execute a process, the process comprising: detecting sensitive data associated with a cloud entity in a cloud computing environment, the cloud computing environment is being deployed with a plurality of cloud entities; querying a graph database storing a security graph to detect a node associated with the cloud entity, wherein the security graph represents the cloud computing environment; determining a reachability path to the node, wherein the reachability path allows access to the cloud entity from a network external to the cloud computing environment; and generating an instruction to secure the sensitive data in response to determining the reachability path.

Certain embodiments disclosed herein also include a system for detecting sensitive data vulnerability in a cloud computing environment. The system comprises: a processing circuitry; and a memory, the memory containing instructions that, when executed by the processing circuitry, configure the system to: detect sensitive data associated with a cloud entity in a cloud computing environment, the cloud computing environment is being deployed with a plurality of cloud entities; query a graph database storing a security graph to detect a node associated with the cloud entity, wherein the security graph represents the cloud computing environment; determine a reachability path to the node, wherein the reachability path allows access to the cloud entity from a network external to the cloud computing environment; and generate an instruction to secure the sensitive data in response to determining the reachability path.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
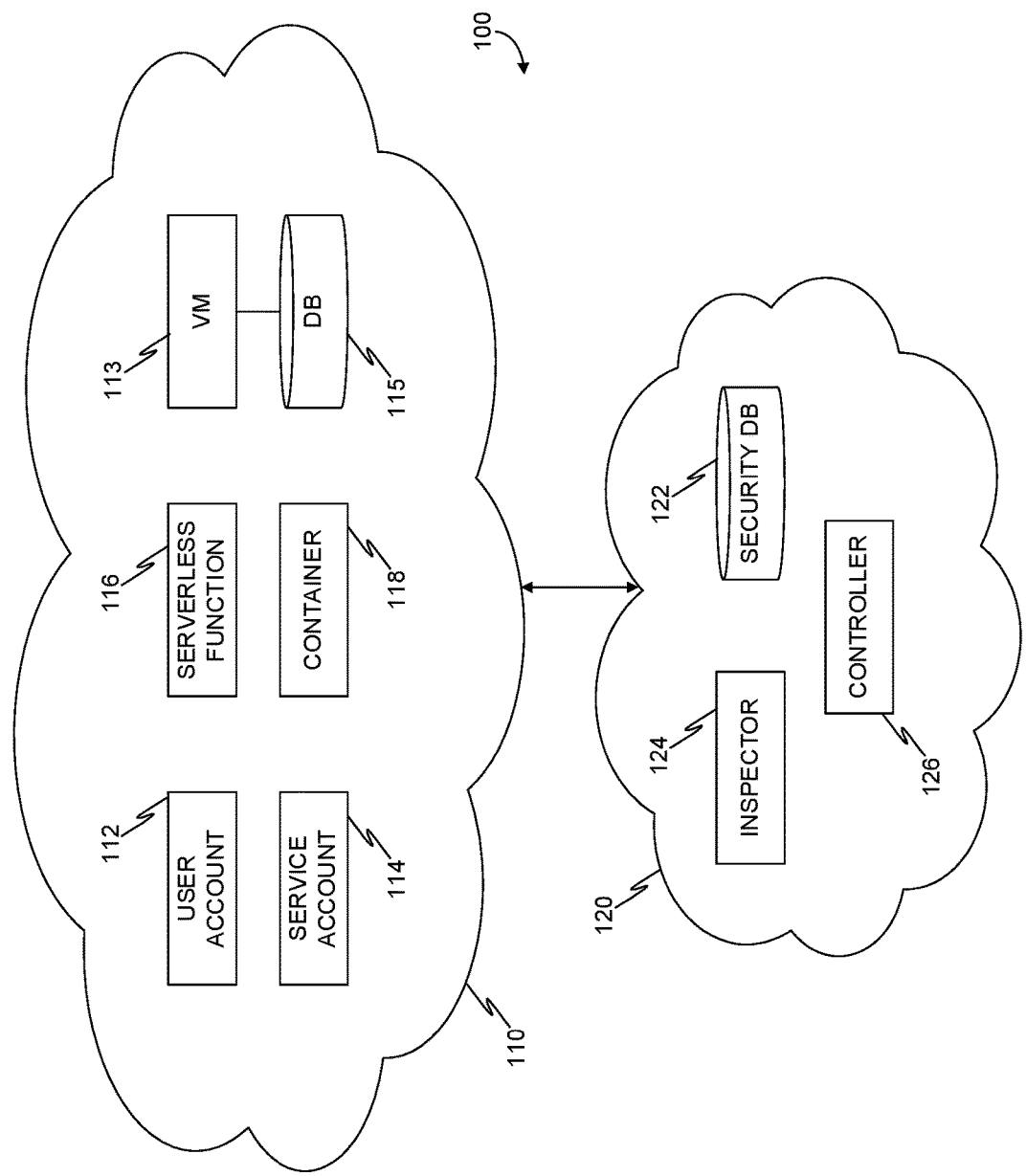
FIG. 1 is a network diagram of a cloud computing environment with an inspection environment utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting vulnerable sensitive data in a network environment, and offering mitigation. Detecting sensitive data which is potentially exposed is beneficial in order to prevent such data from becoming actually exposed. Detecting sensitive data on its own is not enough, as this lacks context of what is actually exposed to external networks. Attempts to access a secure network from an external network in random searches to discover sensitive data is likewise inefficient as it requires extensive use of network bandwidth, and relies on randomness, which may miss, for example, an open port.

Sensitive data may be stored as structured or unstructured data. In certain embodiments, sensitive data may be tagged, for example, to indicate personally identifiable information (PII). Sensitive data may be stored, for example, in a persistent volume (PV) in a cloud computing environment. The PV may be accessible to a workload, such as a virtual machine, a container, a serverless function, and the like. A workload that includes a vulnerability, an exposure, a misconfiguration, an exposed key, and the like other cybersecurity threats, may be used by an attacker to gain access to the sensitive data stored in the PV through the vulnerable workload. In an embodiment, sensitive data is stored in any one of: a database application hosted on the cloud entity, a cloud object storage, a file, a folder, and any combination thereof.

The disclosed system detects sensitive data in a network environment, such as a cloud computing environment, determines where the sensitive data is stored and what may access such storage. The system includes a security graph, which is a graph representation of the network environment, including principal nodes, resource nodes, enrichment nodes, cybersecurity threat nodes, and the like. For example, a storage (e.g., a PV) may be represented in a security graph as a node, connected to another node which represents a workload which can access the PV. In the example, the node representing the workload is in turn connected to a node representing a vulnerability, resulting in an exposure of the workload to an external network. In certain embodiment, the security graph may be traversed to determine network paths between a workload hosting sensitive data (i.e., having access to sensitive data) and an external network. A network path may include a plurality of elements, such that each element in the network path may access at least another element in the network path. For each network path reachability properties may be determined for each element of the network path.

Therefore, the method disclosed allows determining when a workload is vulnerable (i.e., includes a cybersecurity threat) and further has access to sensitive data, resulting in potential exposure of the sensitive data, by determining a reachability property of the workload. This allows to effectively detect potentially exposed sensitive data without wasting network bandwidth, or presenting 'false positive' alerts, which is caused for example by detecting sensitive data present on a workload which does not include a cybersecurity threat and therefore does not potentially expose the sensitive data.

It is recognized that humans can determine if data is sensitive, and may further determine if a workload which has access to sensitive data is somehow vulnerable. However, a human determining if data is sensitive data uses subjective criteria to make such determinations, and as a result such determinations are not consistent. Even when a human attempts to apply objective criteria, how the criteria is applied in practice is still a subjective thought process. A system applying objective criteria to determine what constitutes sensitive data does so efficiently and consistently, which a human operator is not capable of doing.

Furthermore, determining reachability properties of a network path may include inspecting hundreds or thousands of IP addresses, and inspecting each IP address for multiple different ports, using different protocols. While it may be possible for a human to input commands to perform each of these checks, in practice the amount of time it would take would not only make this task improbable, but given that network environment constantly changes and adapt, by the time a human operator finishes inspecting even a single machine, the network environment may have already changed, thus rendering the action irrelevant.

The disclosed system and method overcome these challenges by providing consistent results, and detecting potentially exposed sensitive data.

FIG. 1 is an example of a network diagram 100 of a cloud computing environment with an inspection environment utilized to describe the various embodiments. A cloud computing environment 110 may be implemented, for example, as a virtual private cloud (VPC) deployed on a cloud infrastructure. A cloud infrastructure may be, for example, Amazon® Web Services (AWS), Microsoft® Azure, Google® Cloud Platform (GCP), Oracle® Cloud Infrastructure (OCI), and the like. The cloud computing environment 110 includes cloud entities, such as principals and resources. A resource is a cloud entity which supplies functionality, such as processing power, memory, storage, communication, and the like. A resource may supply more than one functionality. Resources may include, for example, applications, appliances, virtual machines (VMs) such as VM 113, container engines such as container engine 118, serverless functions such as serverless function 116, and the like. A VM may be implemented using Oracle® VirtualBox. A container engine may be implemented using Kubernetes® or Docker®. A serverless function may be implemented using Lambda®.

A principal is a cloud entity which acts on a resource, meaning it can request, or otherwise initiate, actions or operations in the cloud environment 110 which cause a resource to perform a function. A principal may be, for example, a user account such as user account 112, a service account such as service account 114, a role, and the like. In an embodiment a user account 112 is implemented as a data structure which includes information about an entity, such as username, a password hash, an associated role, and the like.

The VM 113 includes therein a database 115. In an embodiment, the database 115 may maintain or store sensitive data. The database 115 is one example of how sensitive data may be stored. For example, credit card numbers and a name associated with each credit card number may be stored in a table on the database 115. Sensitive data may be stored as structured data (e.g., as a table in a database), or unstructured data (e.g., as files in a folder). In an embodiment, the VM 113 includes a database management system (DBMS) which is a software application used to create, define, maintain, and control access to the database 115. A DBMS may be, for example MySQL®, Microsoft® SQL Server, and the like. Other types of structured data may be utilized in other embodiments, such as SQL databases (e.g., relational databases, analytical databases, etc.) and NoSQL databases (i.e., graph databases, column databases, key-value store, document store, etc.).

In certain embodiments, the DBMS application provides access to the database 115. The DBMS may include vulnerabilities which can be exploited. A vulnerability is a known weakness in a software program, which allows unauthorized access. Vulnerabilities are cataloged, for example, in the Common Vulnerabilities and Exposures (CVE) database. Exploiting a vulnerability of the DBMS, a malicious hacker may gain access to the database 115 and to the sensitive data stored therein.

A cloud computing environment 110 may include therein a plurality of databases, such as database 115. However, not every database contains sensitive data. Additionally, sensitive data may be further classified into different categories of sensitivity, such as personal identifiable information (PII), payment card industry (PCI) information (e.g., credit card number), and the like. When inspecting a cloud computing environment for vulnerabilities, it is beneficial to categorize the results based, for example, on severity posed by each vulnerability. However, a vulnerability in a first workload is not as severe as the same vulnerability in a second workload, if the workloads contain different data, for example. Furthermore, it can be beneficial to inspect workloads containing sensitive data more often than workloads which do not contain sensitive data. This allows for preserving resources, i.e., rather than inspecting all workloads at each inspection cycle, workloads which do not contain sensitive data may be inspected less often, thus requiring less computational resources.

The cloud computing environment 110 is communicatively coupled with an inspection environment 120. The inspection environment 120 is a cloud computing environment. The cloud computing environment of the inspection environment 120 may be implemented as a VPC, for example, on the same, or different, cloud infrastructure as the cloud computing environment 110. In some embodiments, certain instances deployed in the inspection environment 120 may be deployed in the cloud computing environment 110.

The inspection environment 120 includes a plurality of inspector workloads, such as inspector 124. The inspector 124 is configured to inspect cloud entities of the cloud computing environment 110. In an embodiment, a snapshot may be generated based on a disk of a workload, such as the container 118. The snapshot may be mounted as a volume which is accessible by the inspector 124. The inspector 124 may inspect the volume for security objects, such as secrets, keys, user account information, and the like. In some embodiments, the inspector 124 inspects the volume for applications, operating systems, binaries, libraries, and the like.

The inspection environment 120 further includes a security database 122, which is a graph database. The security database 122 is distinct from the database 115. The security database 122 is part of the inspection environment 120, while the database 115 is part of a cloud computing environment 110 which is inspected by the inspection environment 120. A security graph may be stored on the security database 122. The security graph includes a representation of the cloud computing environment 110. For example, cloud entities of the cloud computing environment 110 may be represented each as nodes in the security graph. An example of a security graph is discussed in more detail with respect to FIG. 2 below. In an embodiment, the security graph is generated based on objects detected by an inspector, such as inspector 124.

A controller 126 is further included in the inspection environment 120. In an embodiment, the controller 126 is a workload deployed in the inspection environment 120 which is configured to initiate inspection of the cloud computing environment 110. For example, initiating inspection may include determining what cloud entities to inspect, when to inspect them, and the like.

In some embodiments, the controller 126 is further configured to query the security graph to determine the reachability properties of workloads in the cloud computing environment 110. In an embodiment, static analysis techniques can be used in order to determine reachability properties of a resource deployed in the cloud computing environment 110. Reachability properties, or parameters, may be utilized to establish a network path to the resource from an external network through the cloud computing environment. An example of a static analysis process for determining reachability to a cloud entity, is discussed in more detail in U.S. Non-Provisional patent application Ser. No. 17/179,135 filed on Feb. 18, 2021 (hereinafter the '135 Application), the contents of which are hereby incorporated by reference herein. In certain embodiments, the controller 126 may be utilized to determine reachability of a cloud entity.

In certain embodiments, the controller 126 may detect a workload containing sensitive data and determine reachability parameters for the workload. In some embodiments, the controller 126 may determine that data is sensitive, for example, based on a structure of the data, a value of the data, and the like. In other embodiments, sensitive data may be tagged. For example, a database containing patient information may be tagged as PII. In an embodiment, the controller 126 may configure an inspector, such as inspector 124 to inspect a workload containing sensitive data more often than a workload not containing sensitive data.

Figure 2:
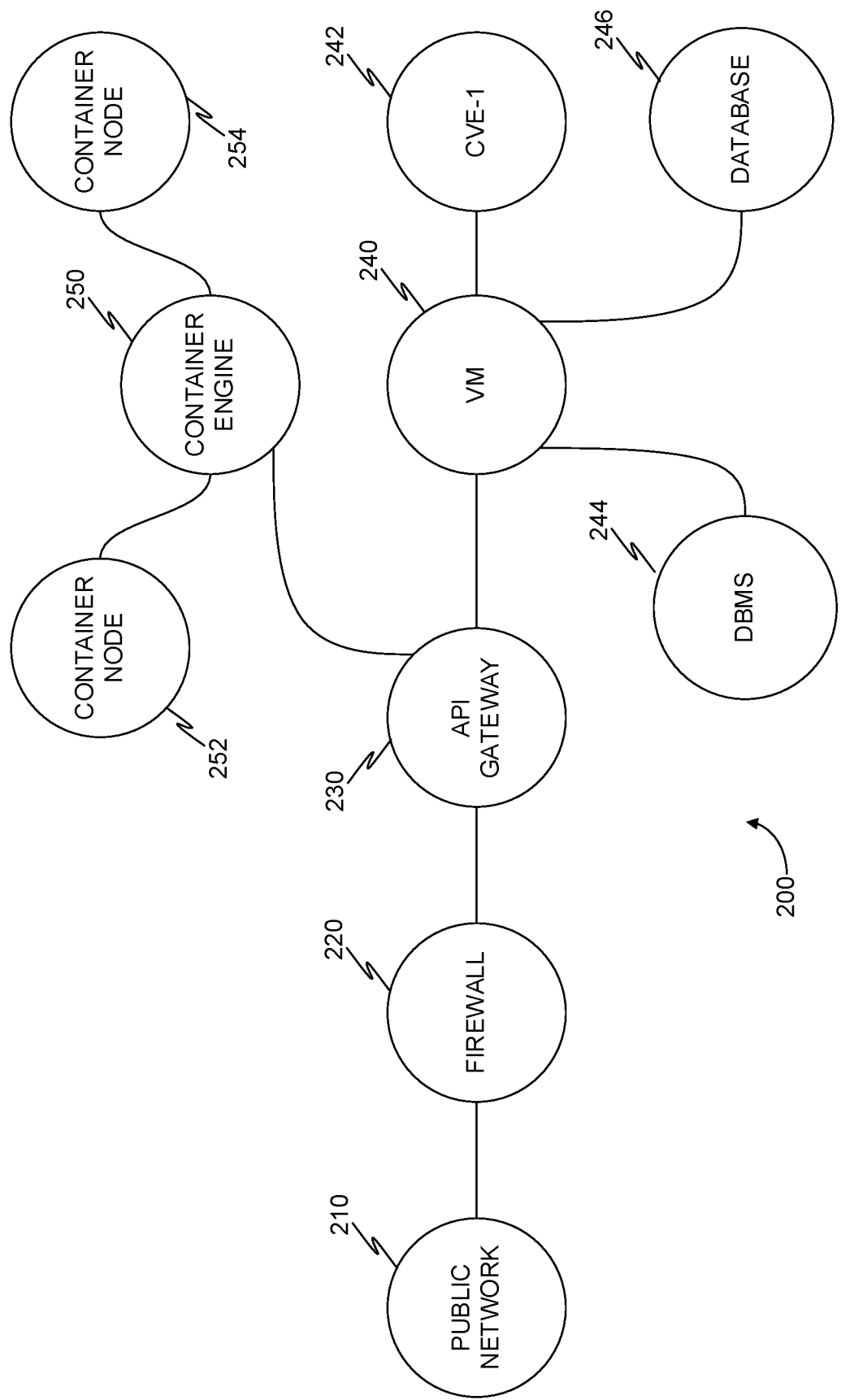
FIG. 2 is a security graph illustrating network paths, implemented in accordance with an embodiment

FIG. 2 is an example of a security graph 200 illustrating network paths, implemented in accordance with an embodiment. A network path may be used to determine reachability parameters. In an embodiment, the security graph 200 represents a portion of the cloud computing environment 110 of FIG. 1 above.

The security graph 200 includes a plurality of nodes, each node connected to at least another node by an edge. In certain embodiments, a pair of nodes may be connected by a plurality of edges. In some embodiments, each edge may indicate a type of connection between the nodes. For example, an edge may indicate a "can access", to indicate that a cloud entity represented by a first node can access the cloud entity represented by a second node.

A first enrichment node 210 (also referred to as public network node 210) represents a public network, such as the Internet. An enrichment node, such as enrichment node 210, is a node generated based off of insights determined from data collected from a computing environment, such as the cloud computing environment 110 of FIG. 1 above. An enrichment node may also represent, for example, a vulnerability. By connecting resource nodes (i.e., nodes representing resources) in the security graph 200 to the enrichment node representing a vulnerability, the security graph 200 may indicate that the resources contain the vulnerability. This allows a compact representation as the security graph does not redundantly store multiple data fields of the same vulnerability in each resource node.

The public network node 210 is connected to a first resource node 220 (also referred to as firewall node 220) representing a firewall workload. The firewall represented by the firewall node 220 may be implemented, for example, as a virtual machine in the first cloud computing environment. Connecting the public network node 210 to the firewall node 220 represents that the firewall is open to sending and receiving communication between itself and the public network.

The firewall node 220 is further connected to a second resource node 230 (also referred to as API gateway node 230) which represents an API (application programming interface) gateway. An API gateway is a workload, for example a serverless function, which can act as a reverse proxy between a client and resources, accepting API calls, directing them to the appropriate service, workload, resource, etc. and returning a result to the client when appropriate.

The API gateway node 230 is connected to a first principal node 240 (also referred to as VM node 240) representing a virtual machine hosting an application (represented by an application node 244) and a database (represented by a database node 246), and is also connected to a second principal node 250 (also referred to as container engine node 250) which hosts a plurality of container nodes, represented for example by container node 252 and container node 254. The VM node 240 is connected to a vulnerability node 242, an application node 244 representing a database management system (DBMS) application, and a database node 246.

In an embodiment, the vulnerability node 242 represents a vulnerability which is present on the VM, the DBMS, or another application deployed on the VM. In an embodiment the application node 242 indicates that a certain application, having a version number, binaries, files, libraries, and the like, is deployed on the VM which is represented by the VM node 240.

In an embodiment, the VM node 240 may be connected to a plurality of application nodes. The database node 246 represents a database which is stored on the VM (represented by VM node 240), or stored on a storage accessible by the VM. The database node 246 may include attributes which define a database, such as type (graph, columnar, distributed, etc.), version number, query language, access policy, and the like. In certain embodiments the database node 246 may further include an attribute which corresponds to sensitive data, in order to indicate that sensitive data is stored in the database represented by the database node 246.

Figure 3:
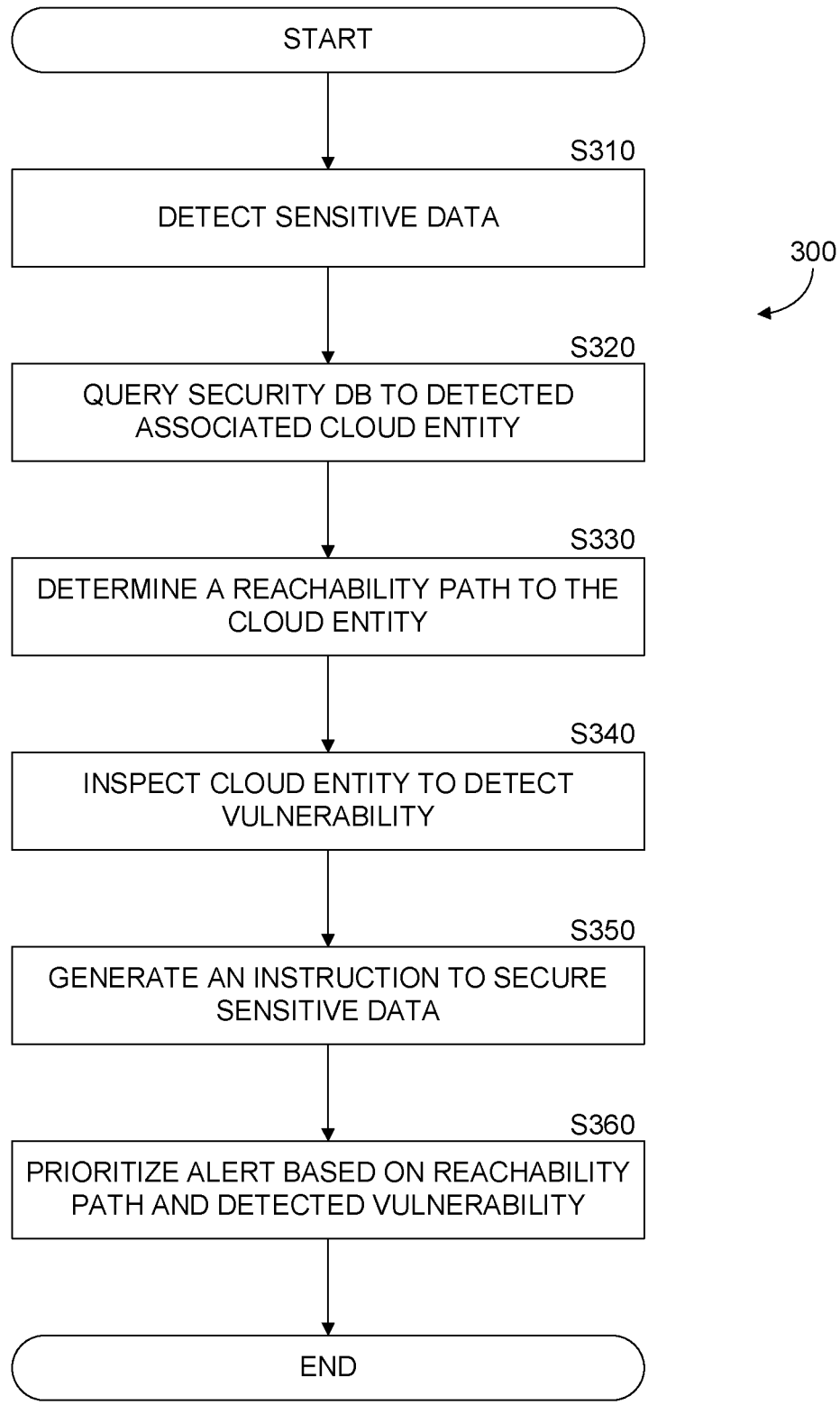
FIG. 3 is a flowchart of a method for detecting data vulnerability in a cloud computing environment, implemented in accordance with an embodiment.

FIG. 3 is an example of a flowchart 300 of a method for detecting data vulnerability in a cloud computing environment, implemented in accordance with an embodiment. In an embodiment, the method may be performed by the controller 126 of FIG. 1.

At S310, sensitive data is detected in cloud entities deployed in a cloud computing environment. Sensitive data may be structured (e.g., a database) or unstructured (e.g., files). In an embodiment, sensitive data may be detected by a querying a security graph in which the cloud computing environment is represented. Sensitive data may be represented in the graph as a node, having a tag indicating that the data is sensitive. In an embodiment, a node representing a workload is tagged to indicate that sensitive data is stored therein. An example of a security graph is provided in FIG. 2.

A cloud entity may be, for example, a principal, a resource, and the like. For example, a resource, such as a workload (e.g., virtual machine, container, serverless function, etc.) may store therein sensitive data, for example, on a persistent volume attached to the workload. As another example, a user account (i.e., a type of principal) may be associated with a secret, such as a cryptographic key. A user account and the corresponding secret may be stored as unstructured data (i.e., files in a folder).

In some embodiments, a workload may be inspected to determine if sensitive data is stored therein. For example, an inspector may inspect a workload to detect a certain data structure object, such as a database. Detecting a database may include searching for files and folder names which indicate that a database management system is installed on the workload. Further, the data structure object may be accessed to determine if a sensitive data indicator is detected. For example, column names of a database may correspond to predetermined names which indicate sensitive data. Predetermined names may be stored for example as a list. Values from the list of predetermined names may be compared to column names, for example by using natural language processing (NLP).

In an embodiment, a score may be determined between a column name and a value from the list of predetermined names. If the score exceeds a predetermined threshold, the column name and value are determined to be matched. For example, Word2vec may be used between a column name "first_name" to be matched to a value of "first name" from a list of predetermined names, where the values of the predetermined names indicate that a column having such a name contains sensitive data.

At S320, a cloud entity associated with the sensitive data is detected. In an embodiment, the cloud entity is detected by querying a security graph. For example, a resource, such as a database, may be represented as a node in a security graph. The node may include a tag indicating that the database is associated with sensitive data. The security graph may be queried to detect a node having a tag indicating sensitive data.

At S330, a reachability path to the cloud entity is determined. In an embodiment, determining a reachability path includes a network path to access the cloud entity in the cloud computing environment from an external network, which is not the cloud computing environment. Access from an external network represents a security risk, as it allows network traffic between a potentially unsecure network into the cloud computing environment. Attackers frequently use external networks, such as the Internet, to gain access to secure networks (e.g., cloud computing environments). In an embodiment, a network path may be stored as a data string which includes one or more reachability parameters. Such parameters include host names, protocols, IP addresses, ports, usernames, passwords, and the like. In certain embodiments, an instruction may be generated which when executed queries the security graph to generate an output including one or more network paths.

An example of a static analysis process for generating a reachability path to a resource is discussed in more detail the '135 Application referenced above.

At optional S340, an instruction is generated to inspect the cloud entity containing the sensitive data to detect a vulnerability. The instruction may be executed by an inspector. In the example of the database above, a database management system (DBMS) application may include a vulnerability. The vulnerability may allow, for example, unauthorized access by exploiting the vulnerability. In some embodiments, the vulnerability may include a misconfiguration. For example, a security policy may specify that a database containing sensitive data should include password protection. In this example, the misconfiguration therefore, is for the database to not require a password in order to access the database. A cloud entity which includes a vulnerability may be more susceptible to exposure. It is therefore beneficial to determine if the cloud entity includes a vulnerability, for example, when determining an alert severity to assign to an alert generated in response to detecting potentially exposed sensitive data. For example, a security graph may be queried to detect a node which represents a workload, wherein the node is connected by an edge in the security graph to another node, the another node representing a vulnerability.

At S350, an instruction is generated to secure the sensitive data. In an embodiment, the instruction may be executed for example by a firewall (such as the firewall represented by firewall node 220 of FIG. 2), an API gateway (such as the API gateway represented by the API gateway node 230 of FIG. 2), and the like. In an embodiment, the instruction, when executed, configures a workload hosting the sensitive data to reject unauthorized connection requests. In certain embodiments, the instruction, when executed, generates an alert to indicate that the sensitive data is vulnerable, or otherwise exposed. In other embodiments, the instruction, when executed, configures a workload hosting the sensitive data to update an application, wherein the application is associated with a detected vulnerability. In some embodiments, the instruction, when executed, configures a workload hosting the sensitive data to update a misconfiguration associated with the workload. The instruction may further include generating an alert to indicate that the workload is misconfigured. In some embodiments, a plurality of instructions may be generated to secure the sensitive data.

At optional S360, an alert is prioritized based on the reachability path. In certain embodiments, the alert may be prioritized further based on the detected vulnerability. In an embodiment, an alert is generated in response to detecting a workload having a vulnerability.

In certain embodiments, sensitive data may be determined to be exposed, or potentially exposed, based on association with a role, compromised identity, and the like. For example, sensitive data may be assigned a public role, which allows any user to access the sensitive data. As another example, an identity may be determined to be compromised by detecting an exposed secret, such as a password, which is associated with the identity. A node in a security graph may represent sensitive data, wherein the node is connected to a principal node (i.e., a node representing a user account, service account, role, and the like), which is authorized to access the sensitive data. In an embodiment, an identity authentication management (IAM) server may be queried, based on any one of: an identifier of the sensitive data, a user account identifier, service account identifier, role, and the like, to determine what user account, service account, role, etc. has permissions to access the sensitive data. Permissions may include, for example, a read permission, a write permission, a purge permission, and the like.

Figure 4:
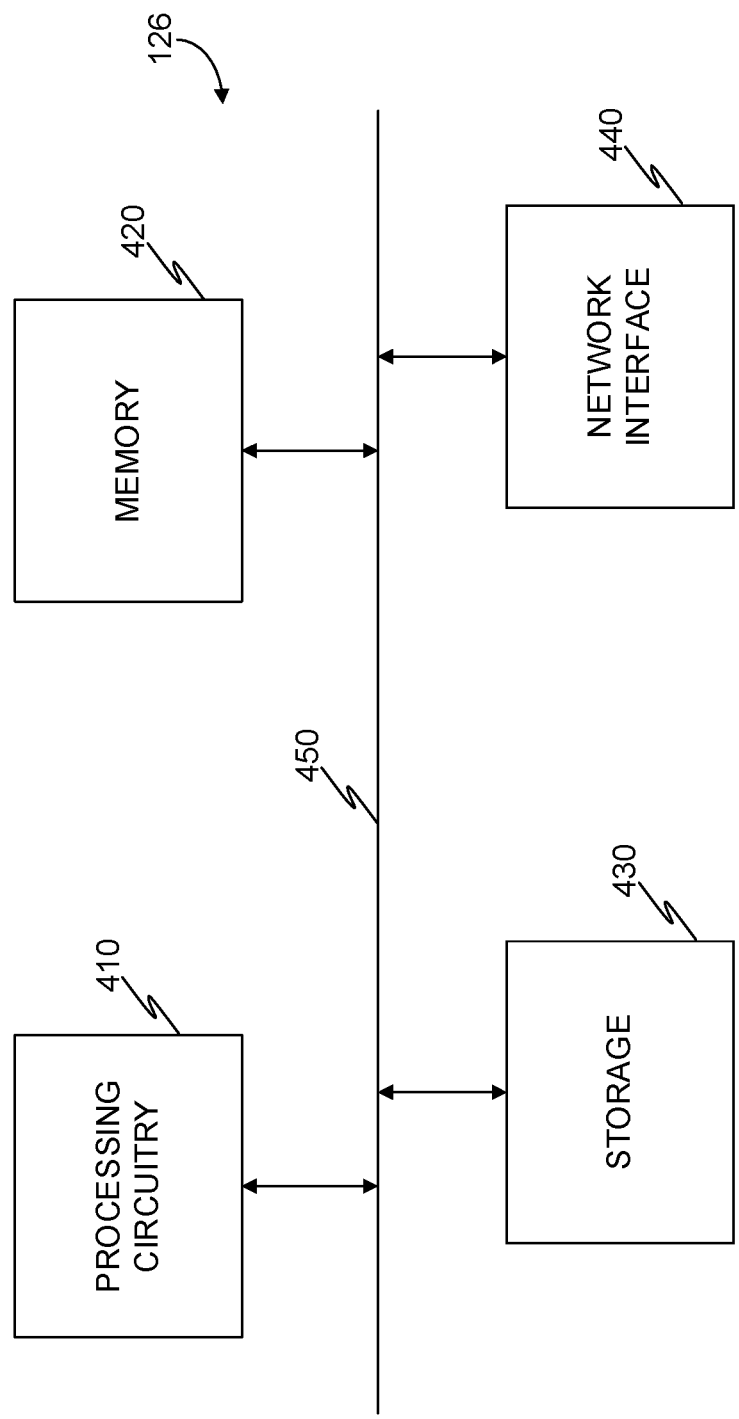
FIG. 4 is a schematic diagram of a controller workload according to an embodiment.

FIG. 4 is an example schematic diagram of a controller workload (controller) 126 according to an embodiment. The controller 126 includes a processing circuitry 410 coupled to a memory 420, a storage 430, and a network interface 440. In an embodiment, the components of the controller 126 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the controller 126 to communicate with, for example, the inspector 124, the security database 122, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting sensitive data vulnerability in a cloud computing environment, comprising:
    detecting data associated with a cloud entity in a cloud computing environment, wherein the cloud computing environment is deployed with a plurality of cloud entities;
    determining that the detected data is sensitive data based on metadata of the detected data;
    querying a graph database storing a security graph to detect a node representing a resource associated with the cloud entity, wherein the security graph represents the cloud computing environment, and wherein the representation includes a node representing a principal and a node representing a resource;
    determining a network reachability path to the node, wherein the network reachability path allows access to the cloud entity from a network external to the cloud computing environment, wherein the network reachability path includes at least a reachability parameter;
    inspecting the resource for a vulnerability; and
    executing an instruction to secure the sensitive data in response to determining that the resource includes the vulnerability and that the network reachability path allows access to the cloud entity from the network external to the cloud computing environment.

2. The method of claim 1, wherein the cloud entity is any one of: a resource, and a principal.

3. The method of claim 1, further comprising:
    inspecting the cloud entity to detect a data structure object, the data structure object potentially hosting sensitive data.

4. The method of claim 3, further comprising:
    accessing the data structure object to detect at least a sensitive data indicator; and
    detecting the sensitive data associated with the cloud entity based on the detected at least a sensitive data indicator.

5. The method of claim 1, wherein the reachability path includes at least a reachability parameter.

6. The method of claim 5, wherein the at least a reachability parameter is any one of: a host name, a protocol, an IP address, a port, a username, and a password.

7. The method of claim 1, further comprising:
    inspecting the cloud entity to detect any one of: a vulnerability, and a misconfiguration.

8. The method of claim 7, further comprising:
    generating an alert in response to determining the reachability path, and any one of: the detected vulnerability, and misconfiguration.

9. The method of claim 7, further comprising:
    determining a severity of an alert, based on: the reachability path, and any one of: the detected vulnerability, and misconfiguration.

10. The method of claim 1, wherein determining the network reachability path further comprises:
    traversing the security graph to identify a plurality of network paths between the node and another node;
    determining for each network path a path element; and
    determining for each path element a reachable property.

11. The method of claim 1, wherein the instruction, when executed by a workload hosting the sensitive data, configures the workload to:
    update an application hosted on the workload, wherein the application is associated with a detected vulnerability.

12. The method of claim 1, wherein the instruction, when executed by a workload hosting the sensitive data, configures the workload to:
    update a misconfiguration associated with an application hosted on the workload.

13. The method of claim 1, wherein the sensitive data is stored in any one of: a database application hosted on the cloud entity, a cloud object storage, a file, a folder, and any combination thereof.

14. The method of claim 1, further comprising:
    determining that the sensitive data is exposed in response to querying an identity authentication management (IAM) system, the IAM system indicating that the sensitive data is accessible to a predetermined role.

15. A non-transitory computer readable medium having stored thereon instructions for causing a processing circuitry to execute a process, the process comprising:
    detecting data associated with a cloud entity in a cloud computing environment, wherein the cloud computing environment is deployed with a plurality of cloud entities;
    determining that the detected data is sensitive data based on metadata of the detected data;
    querying a graph database storing a security graph to detect a node representing a resource associated with the cloud entity, wherein the security graph represents the cloud computing environment, and wherein the representation includes a node representing a principal and a node representing a resource;
    determining a network reachability path to the node, wherein the network reachability path allows access to the cloud entity from a network external to the cloud computing environment, wherein the network reachability path includes at least a reachability parameter;
    inspecting the resource for a vulnerability; and
    executing an instruction to secure the sensitive data in response to determining that the resource includes the vulnerability and that the network reachability path allows access to the cloud entity from the network external to the cloud computing environment.

16. A system for detecting sensitive data vulnerability in a cloud computing environment, comprising:
   a processing circuitry; and
   a memory, the memory containing instructions that, when executed by the processing circuitry, configure the system to:
   detect data associated with a cloud entity in a cloud computing environment, wherein the cloud computing environment is deployed with a plurality of cloud entities;
   determine that the detected data is sensitive data based on metadata of the detected data;
   query a graph database storing a security graph to detect a node representing a resource associated with the cloud entity, wherein the security graph represents the cloud computing environment, and wherein the representation includes a node representing a principal and a node representing a resource;
   determine a network reachability path to the node, wherein the network reachability path allows access to the cloud entity from a network external to the cloud computing environment, wherein the network reachability path includes at least a reachability parameter;
   inspect the resource for a vulnerability; and
   execute an instruction to secure the sensitive data in response to determining that the resource includes the vulnerability and that the network reachability path allows access to the cloud entity from the network external to the cloud computing environment.

17. The system of claim 16, wherein the cloud entity is any one of: a resource, and a principal.

18. The system of claim 16, wherein the memory contains further instructions that, when executed by the processing circuitry, further configure the system to:
   inspect the cloud entity to detect a data structure object, the data structure object potentially hosting sensitive data.

19. The system of claim 18, wherein the memory contains further instructions that, when executed by the processing circuitry, further configure the system to:
   access the data structure object to detect at least a sensitive data indicator; and
   detect the sensitive data associated with the cloud entity based on the detected at least a sensitive data indicator.

20. The system of claim 16, wherein the reachability path includes at least a reachability parameter.

21. The system of claim 20, wherein the at least a reachability parameter is any one of: a host name, a protocol, an IP address, a port, a username, and a password.

22. The system of claim 16, wherein the memory contains further instructions that, when executed by the processing circuitry, further configure the system to:
   inspect the cloud entity to detect any one of: a vulnerability, and a misconfiguration.

23. The system of claim 22, wherein the memory contains further instructions that, when executed by the processing circuitry, further configure the system to:
   generate an alert in response to determining the reachability path, and any one of: the detected vulnerability, and misconfiguration.

24. The system of claim 22, wherein the memory contains further instructions that, when executed by the processing circuitry, further configure the system to:
   determine a severity of an alert, based on: the reachability path, and any one of: the detected vulnerability, and misconfiguration.

25. The system of claim 16, wherein the memory contains further instructions that, when executed by the processing circuitry for determining the network reachability path, further configure the system to:
   traverse the security graph to identify a plurality of network paths between the node and another node;
   determine for each network path a path element; and
   determine for each path element a reachable property.

26. The system of claim 16, wherein the instruction, when executed by a workload hosting the sensitive data, configures the workload to:
   update an application hosted on the workload, wherein the application is associated with a detected vulnerability.

27. The system of claim 16, wherein the instruction, when executed by a workload hosting the sensitive data, configures the workload to:
   update a misconfiguration associated with an application hosted on the workload.

28. The system of claim 16, wherein the sensitive data is stored in any one of: a database application hosted on the cloud entity, a cloud object storage, a file, a folder, and any combination thereof.

29. The system of claim 16, wherein the memory contains further instructions that, when executed by the processing circuitry, further configure the system to:
   determine that the sensitive data is exposed in response to querying an identity authentication management (IAM) system, the IAM system indicating that the sensitive data is accessible to a predetermined role.

* * * * *